March 15, 1960  F. A. LEISEY  2,928,782
AUTOMATIC TITRATOR
Filed Feb. 9, 1956  4 Sheets-Sheet 2

INVENTOR.
Frank A. Leisey
BY Everett A. Johnson
ATTORNEY

March 15, 1960  F. A. LEISEY  2,928,782
AUTOMATIC TITRATOR
Filed Feb. 9, 1956  4 Sheets-Sheet 3

INVENTOR.
Frank A. Leisey
BY Everett A. Johnson
ATTORNEY

2,928,782
AUTOMATIC TITRATOR

Frank A. Leisey, Chicago, Ill., assignor to Standard Oil Company, Chicago, Ill., a corporation of Indiana Application February 9, 1956, Serial No. 564,572

4 Claims. (Cl. 204—195)

This invention relates to method and apparatus for automatic titration and specifically for determining trace unsaturation in hydrocarbons by coulometric titration.

In many processes it is important to measure quantitatively the proportion of known contaminants. Addition of bromine to double bonds is widely used in the petroleum industry as a measure of unsaturation. Bromination methods of measuring unsaturation differ mainly in the reagent used and in the detection of the end point. Bromine in various solvents and bromate-bromide solution are the common reagents. Results are reported either as bromine number—the grams of bromine that will add to 100 grams of sample—or as bromine index—the milligrams of bromine that will add to 100 grams. Time-consuming volumetric methods have largely been displaced by a rapid electrometric method that gives a sharper end point. However, the electrometric method does not give satisfactory results with samples having bromine indices below 1000 because the end point is diffuse, even with large samples. To provide rapid and accurate results in the bromine index range, a coulometric method of introducing the titrant has been devised with amperometric detection of the end point.

In the new method, bromine generated in the titration cell reacts with the unsaturated compounds in the sample, the end point is detected by a reference current, and the generation time determines the bromine index of the sample. Because bromine is released at a constant low rate, rather than in the concentrated pulses common to manual titration, side reactions are minimized.

The preparation of reliable standard solution involves the expenditure of considerable effort and frequently the operator must employ indirect and time-consuming techniques. Furthermore, the changes in such solutions which often take place with the passage of time would change the characteristics of the reagent. Likewise, the difficulty in making precise measurement of the solution and failure to control the addition of the reagent introduced errors. These and other disadvantages tend to make the volumetric systems unreliable and not adaptable for plant control.

Electrical methods have been devised for determining the titration end point but such still required adding volumetric titration reagents. Furthermore, each such method involves careful manipulation and interpretation of results by a highly skilled operator and was not adaptable to the determination of unusually low concentrations of unsaturates or low bromine index values.

It is, therefore, a principal object of my invention to produce and introduce the titrating reagent in a manner which is controllable and reproducible and which avoids the difficulties inherent in any liquid volumetric system. Another object of my invention is to provide a method and means for the determination of unsaturation which eliminates the preparation, standardization, storage, controlled introduction and measurement of volumetric reagents.

It is a further object of my invention to minimize the number of steps required for making a titration of trace unsaturation in hydrocarbons and, in addition, it is an object to eliminate any need for standardize reagents and to avoid the difficulties resulting from the use of volumetric reagents.

Another object of my invention is to provide a method and means which lends itself readily to automatic control and regulation. More specifically, it is an object of my invention to provide an electrical method and system for generating reagents and for detecting the end point in a simple, accurate and rapid manner. A further object is to provide a method and system where the use of a liquid reagent is eliminated, titrations are rapid, and wherein unusually low concentrations of unsaturates can be measured. These and other objects of my invention will become apparent as the description thereof proceeds.

Briefly, my invention employs a coulometric method of electrically generating reagents within a titration cell and an amperometric method for detecting the end point. Bromine is generated by a first pair of metal electrodes suspended in the titration cell. A constant direct current passed through the cell via these electrodes generates bromine by oxidation of bromide ions in the electrolyte. The amount of bromine generated under these conditions is directly proportional to the generation time.

A second pair of metal electrodes in the titration cell are connected to a galvanometer and battery in series. Initially, the galvanometer deflection is small, but a rapid increase occurs when the excess bromine is present in the titration cell due to the diffusion current of excess bromine. At a preselected diffusion current, the increased galvanometer deflection directs a narrow beam of light onto a phototube which activates a relay. The relay then turns off the generation current to the first pair of electrodes and stops an electrical timer. The bromine index of the sample is proportional to the readings on the electrical timer or counter.

Further details of my invention will be described in connection with the accompanying drawings wherein.

Figure 1:
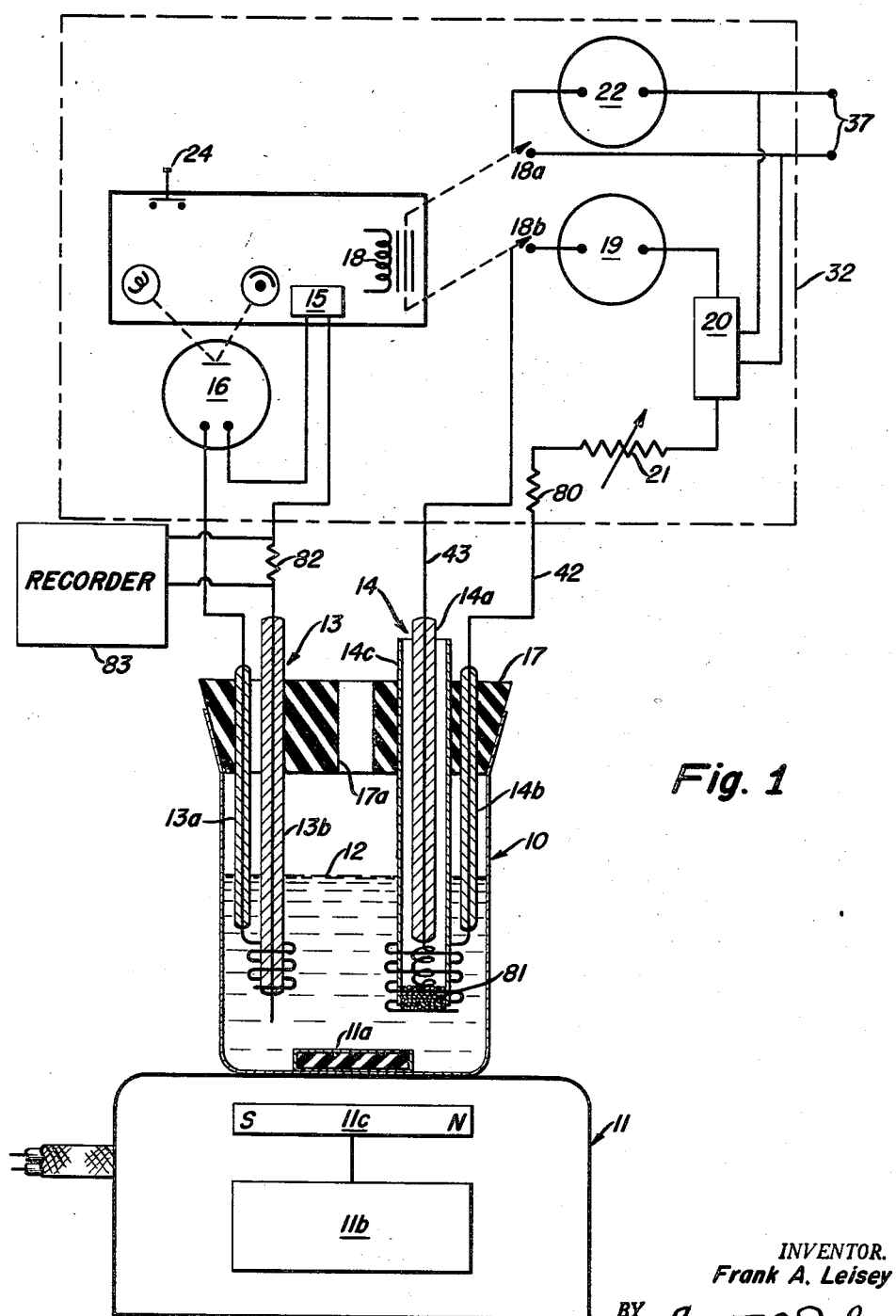
Figure 1 is a schematic diagram of the titration apparatus.

Referring to Figure 1 in the drawings, the titration cell 10 is illustrated as a 100 milliliter beaker. This is placed on a magnetic stirrer 11 with which the Teflon-covered magnetic rod 11a is driven to agitate the titration mixture. The magnetic stirrer 11—11a is of the type wherein a constant speed motor 11b within the housing 11 drives a magnetized bar 11c. When the driven bar 11c and the free stirring rod 11a are magnetically coupled, a swirling action is imparted to the electrolyte 12 within the cell 10.

The solvent electrolyte 12 placed in the cell 10 is comprised essentially of 30 milliliters glacial acetic acid, 13 milliliters methanol, 7 milliliters potassium bromide, and 0.1 gram mercuric acetate or mercuric chloride.

Within the cell 10 are mounted two pairs of electrodes 13 and 14. The first pair of detection electrodes 13 comprises a cathode 13b and an anode 13a connected in series with a direct current source 15 of 0.1 to 0.5 volt and with a light deflection galvanometer 16 having a sensitivity of about 1 microampere per division. The electrodes 13a and 13b may be 20-gauge platinum wires. The cathode consists of a 1-cm. wire sealed in the bottom of a 6 mm. glass tube. The anode is a 3-cm. spiral around the lower portion of the tube.

The ion-generating system includes the pair of generating electrodes 14, also of 20-gauge platinum wire. The anode 14b consists of a 10-cm. wire spiral wound around the lower portion of an 8-mm. glass tube open at the bottom. The cathode 14a is a 5-cm. spiral positioned inside the tube about 3 mm. from the bottom. A plug of glass wool 81 isolates the cathode. These electrodes are connected in series with relay contacts 18b, milliammeter 19, precision resistor 80, current-adjustment rheostat 21, and direct-current source 20. Contacts 18a energize synchronous timer 22. The voltage drop across the precision resistor 80 is measured with a potentiometer to accurately measure the generation current. Currents over 10 milliamperes have been used without difficulty.

The generating electrodes 14 and the detecting electrodes 13 are spaced from each other as far as possible in the titration cell 10. It is contemplated, however, that we may provide an annular cell in which instance the electrode pairs 13 and 14 may be more closely spaced with the positive flow of electrolyte solution being successfully passed through the detecting electrodes 13 and then the generating electrodes 14.

The generating electrode pair 14 is connected in series with the relay 18, a milliammeter 19, a constant direct current source 20 and an adjustable rheostat 21. This circuit maintains the generator current constant since the generator cell resistance and change in cell resistance as the titration proceeds, due to changing electrolyte conductance and cell polarization is very small in comparison to the high resistance of series rheostat 21. In the cell assembly described above, the value of rheostat 21 is greater than 100 times the resistance of the generator cell and the change in cell resistance has been found to be less than 1/10 the generator cell resistance. Rheostat 21 has been made adjustable so that any desired coulometric current up to 10 milliamperes can be selected. Small variations in the conductance of fresh batches of the electrolyte 12 and in the spacing of the electrodes 14a and 14b do not change the generating current.

The synchronous timer 22 is connected in series with contacts 18a of relay 18 and the power line. Pressing the titration push button 24 de-energizes relay 18 whose contacts 18a and 13b then start the ion-generating current across electrodes 14 and the synchronous timer 22.

Figure 3:
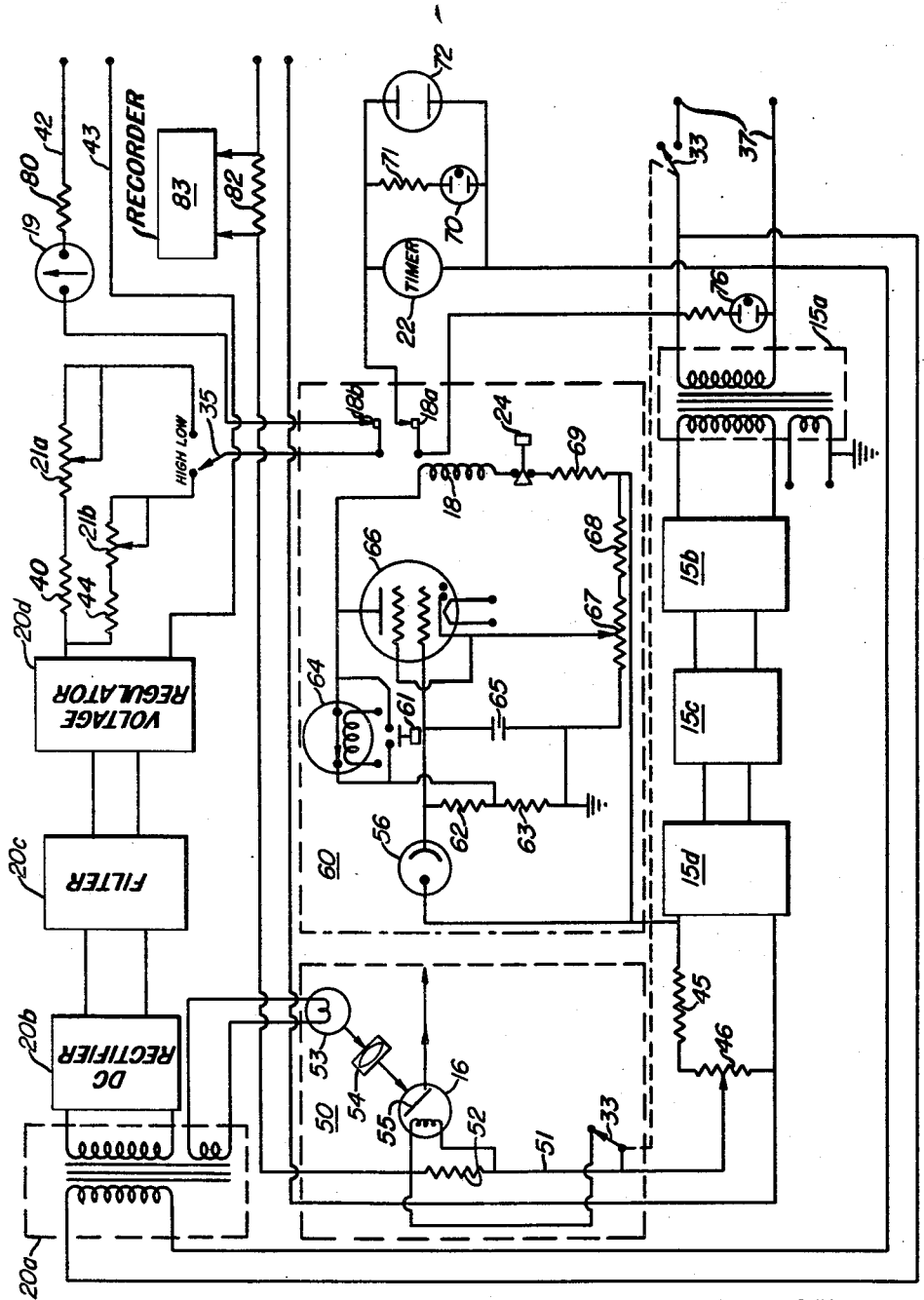
Figure 3 is a circuit diagram showing in more detail the electrical components of the apparatus illustrated in Figure 1.

Two coulometric current ranges, for example, set at 1 and 5 milliamperes, are provided in the titrator circuit of Figure 3. By employing the two ranges, I may obtain better control in the low bromine index range and decreased titration time in the high bromine index range.

Figure 2:
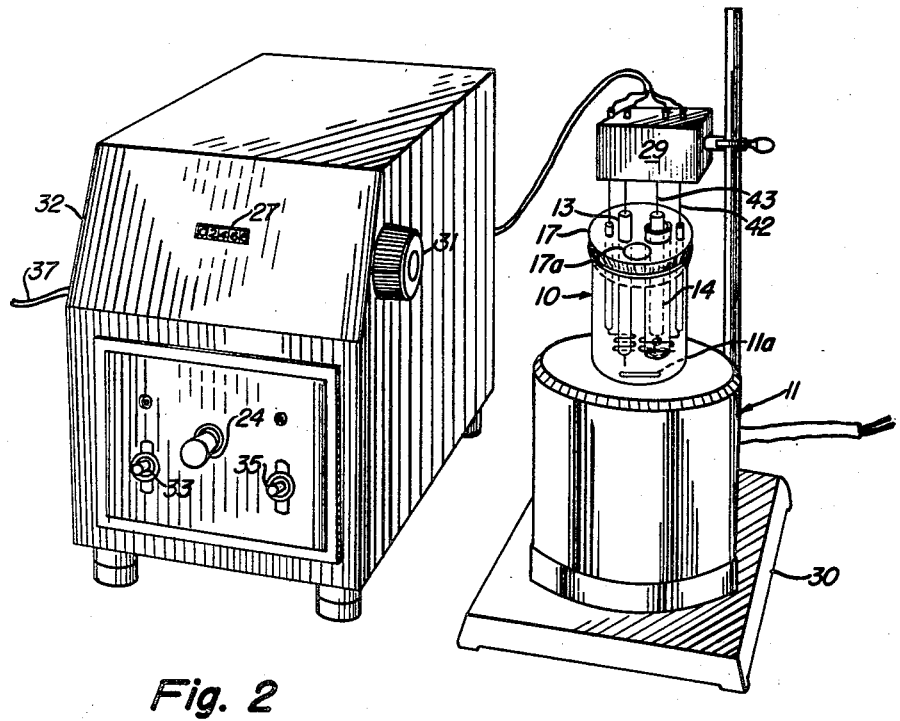
Figure 2 is a perspective of one installation employing one embodiment of the invention.

Referring to Figure 2, I have illustrated a typical installation which includes the magnetic stirrer 11, the titration cell 10, the generating electrode pair 14 and the detecting electrode pair 13 supported in block 29 which in turn is held by ring stand 30. The counter 27 is set to zero by knob 31. The face plate of the instrument case 32 includes the power switch 33, the titration pushbutton 24 and the range selector switch 35.

In Figure 3, I have illustrated in some detail the electrical circuit employed in the apparatus schematically illustrated in Figure 1 and disposed within housing 32 of Figure 2.

The coulometric D.C. power supply 20 (Figure 1) includes in the embodiment shown in Figure 3 the power transformer 20a, a selenium or vacuum tube rectifier 20b, resistance-capacitance filter 20c, and a voltage regulator 20d consisting of gas-filled cold-cathode type tubes. The output voltage of the voltage regulator 20d is constant at the operating voltage of the regulator tubes and should be at least 200 volts or more. In the embodiment shown in Figure 3, an output voltage of 216 volts is obtained. In the low coulometric current range this voltage is applied to resistor 40 and rheostat 21a in series with the selector switch 35, one set of contacts 18b of relay 18, current meter 19 and via lines 42 and 43 to the coulometric generation electrodes 14a and 14b. In the high coulometric current range resistor 44 and rheostat 21b are selected by switch 35. Rheostats 21a and 21b can be adjusted so that any desired coulometric current up to 10 milliamperes can be preset and selected by switch 35.

The amperometric and relay D.C. power supply 15 (Figure 1) is generally similar to the coulometric power supply 20. It contains an isolation transformer 15a, a selenium or vacuum tube rectifier 15b, resistance-capacitance filter 15c, and a gaseous cold-cathode type voltage regulator tube 15d. The output of this power supply 15 is constant at 108 volts. Voltage dropping resistor 45 is in series with potentiometer 46 which adjusts the amperometric voltage between 0 to 0.52 volt. Both power supplies 15 and 20 are connected to the 110 v. A.C. power line 37 through power switch 33. Another set of contacts on power switch 33 short out the galvanometer 16 when the instrument is turned off so as to prevent damage to it when the instrument is moved.

The amperometric galvanometer assembly 50 includes the light deflection galvanometer 16 on line 51 to the platinum electrode 13a with galvanometer dampening resistor 52 across it. A lamp 53 directs a beam of light through the light focusing system 54 with the light beam impinging upon the mirror 55 of the galvanometer 16. With the end point current passing through the electrodes 13 and galvanometer 16, the galvanometer is adjusted to direct the beam of light onto the phototube 56.

The phototube relay unit 60 includes the phototube 56 having load resistors 62 and 63 in series. A thermal delay switch 64 has contacts connected between the resistors 62—63 and to the coil on the relay 18. A filter condenser 65 is placed across the ends of the resistors 62 and 63. A relay tube 66 of the thyratron type, is connected to the relay sensitivity potentiometer 67 which is in turn connected in series with the voltage dropping resistor 68. Current limiting resistor 69 has a terminal connected to the titration start push-button switch 24 which is normally closed. Titration stop switch 61 is connected across the thermal delay switch 64 for convenience. The relay sensitivity potentiometer 67 controls the sensitivity by adjusting the phototube bias voltage.

One set of contacts of relay 18 is connected to the electric timer 22. The other set of contacts is connected to the coulometric generation circuit. A neon lamp 70 is a titration indicator pilot light which is provided with a limiting resistor 71. An outlet socket 72 is provided for an external timer, lamp, alarm, etc. not shown.

Under normal operation conditions, the relay 18 is energized and this prevents the coulometric current from passing to the electrodes 13a and 13b and prevents the timer 22 from operating. When the instrument is first turned on, current from the amperometric power supply 15d flows through resistor 69, switch 24, relay 18, the thermal delay switch 64, load resistor 63, and back to the power supply. This current keeps the relay 18 energized during the instrument warm-up period and also causes the relay tube 66 to become conducting when it warms up to operating conditions by applying a positive bias to its grid during the one minute period when the instrument is first turned on. This is controlled by thermal delay switch 64.

With electrolyte in titration cell 10, the amperometric detection current flowing through the galvanometer 16 causes it to deflect the galvanometer light beam off the phototube 56. The titration switch 24 can be momentarily pushed to start the coulometric current from 20d and operate the timer 22 by de-energizing the relay 18. The relay will remain de-energized until the galvanometer 16 deflects the light beam back to the prototube 56 (at the selected end point where the amperometric current increases) again causing the relay tube 66 to conduct which energizes relay 18.

Figure 5:
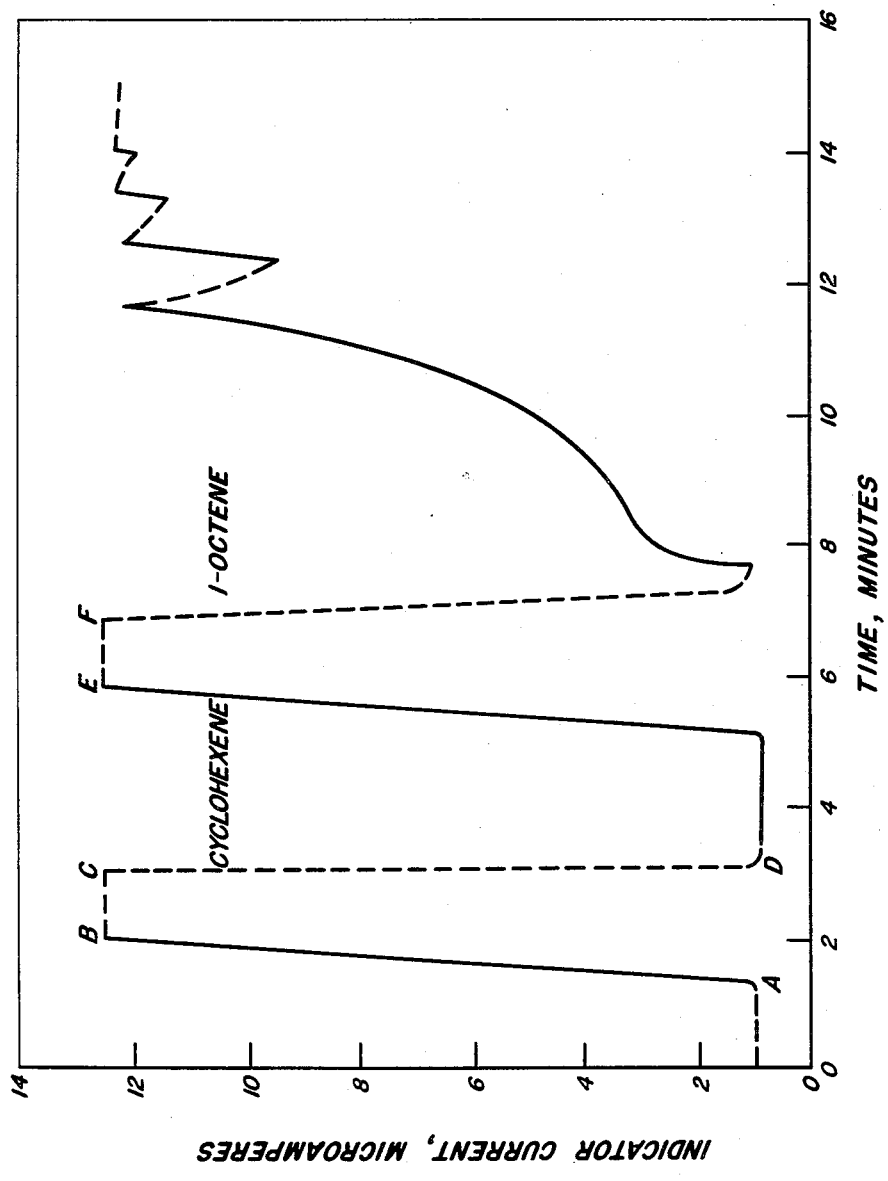
Figure 5 shows typical titration curves.

For observing the titration of more difficultly brominated compounds, a recorder 83 can be connected across resistor 82 in the indicator current circuit in order to plot the indicator current vs. time titration curve, e.g. as shown in Figure 5.

To make a bromine index determination, 50 milliliters of electrolyte 12 is placed in the titration cell 10. The electrode assemblies 13 and 14 are inserted and the titration power is turned on. Passing the push-button 24 starts the titration by de-energizing the relay 18 which then starts the ion generating current through the generating electrode pair 14 and starts the synchronous timer 22 which has a counter 27 to show the generation time. The magnetic stirrer 11 is turned on so that the electrolyte 12 is well circulated by the stirring rod.

Preliminary adjustments made when the titrator is first set up are as follows:

(A) The indicator voltage across the indicator electrode pair 13 is adjusted to about 0.25 volt. This is done by adjusting potentiometer 46.

(B) When the deflection of galvanometer 16 becomes steady, the galvanometer is adjusted to direct the reflected light beam 10 to 15 millimeters from the entrance slit of the phototube 56.

(C) The titration button 24 is pressed and the coulometric current through the generating electrode pair 14 is adjusted by means of rheostat 21a on low or 21b on high range to any desired value up to 10 milliamperes.

(D) Recommended sample sizes and generation current are:

| Estimated Bromine Index | Sample Weight, g. | Generation Current, ma. |
|---|---|---|
| 0–20 | 1.000 | 1.0 |
| 20–200 | 0.600 | 5.0 |
| 200–2,000 | 0.060 | 5.0 |

Prior to introducing any sample into titration cell 10 and immediately before each determination, the titration button 24 is pressed. Bromine is thereby generated in the electrolyte 12 until a fixed reference concentration is reached where the deflection of the galvanometer 16 automatically stops the bromine generation. The sample is pipetted or weighed in, the timer is reset to zero, the titration switch is again pressed, and bromine is generated until the reference current is again reached. The titration time is recorded and, after 40 seconds, the end-point is checked by pressing the titration switch. If the end-point has been reached, the instrument will stop within four seconds. Otherwise, the titration must be continued in one or more steps, waiting 40 seconds between steps, until the total titration time does not increase by more than four seconds. When the timer 22 stops, the bromine index of the sample can be calculated by the equation:

$$\text{Bromine index} = \frac{79.9 \times I \times T}{0.965 \times W}$$

where 79.9 is the equivalent weight of bromine, $I$ is the coulometric current in milliamperes, $T$ is the titration time in seconds, and $W$ is the sample weight in milligrams.

For a given sample size, the generation current can be adjusted so that the timer indicator (counter 27) reads directly in bromine index. For all examples, the coulometric current and sample size can be selected so that a titration can be completed in 2 to 5 minutes.

Figure 4:
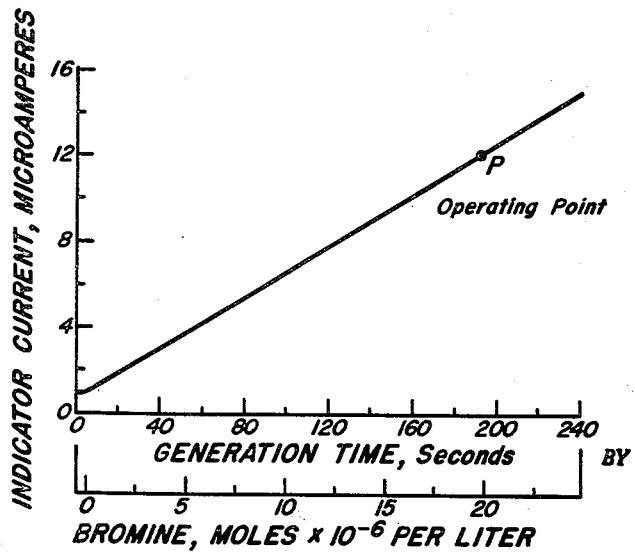
Figure 4 is a representation of a typical deflection curve indicating the relationship between the indicator current and bromine concentration in the titration cell.

During the course of a titration, the current in the amperometric detection system changes as shown in Figure 4. To make the system automatic, the reference current method mentioned above is used. Thus, before the sample is introduced into cell 10 bromine is generated by electrode pair 14 until an arbitrary deflection of approximately 12 microamperes is reached, such as point P in Figure 4. This corresponds to a blank run. The sample is then introduced and the mixture is again automatically titrated to this point. This procedure minimizes any titration error and eliminates the effects of different initial detector currents due to variations in the composition of the electrolyte 12.

Any substance that will react with bromine will interfere with the titration. Examples of such substances are cyanides, thiocyanates, sulfides, and sulfites. However, these substances are not ordinarily present in the petroleum samples tested and can readily be removed if they are known to be present. This can be done by shaking the sample with an appropriate absorbing solution or even water prior to introducing the samples to the titration cell. Each of these inorganic ions can be accurately titrated by this method if they appear individually in a sample. Also, for example, arsenic can be titrated with bromine.

A large number of bromine index titrations can be made with the same electrolyte. This is a further advantage of the method.

Many titrations have been made employing my system and the repeatability obtained with this automatic titrator is much better than any other method. For example, in Table I, I have compared the repeatability of results obtained with the automatic titrator and with synthetic samples of individual olefins covering the Bromine-Index range from 0 to 180. Synthetic samples were prepared by diluting olefins of 99.8+% purity, obtained from the National Bureau of Standards, with analytical-reagent benzene. Repeatability and agreement with calculated values are excellent.

TABLE I

*Bromine indices of synthetic samples*

| Compound | Bromine Index | | | | Standard Deviation |
|---|---|---|---|---|---|
| | Calculated | Found | | | |
| Benzene solvent | 0 | 0 | 0 | 0 | |
| Cyclohexene | 4.5 | 4.6 | 4.5 | 4.5 | 0.07 |
| | 19.6 | 19.5 | 19.4 | 19.7 | 0.16 |
| | 35.5 | 35.5 | 35.4 | 35.2 | 0.16 |
| | 177.0 | 176.6 | 177.0 | 176.8 | 0.20 |
| Di-isobutene | 28.4 | 28.7 | 28.1 | 28.4 | 0.30 |
| | 142.5 | 143.7 | 143.6 | 144.2 | 0.10 |
| 2,4,4-Trimethyl-1-pentene | 24.8 | 24.4 | 24.1 | 24.7 | 0.30 |
| | 124.1 | 124.3 | 124.6 | 123.8 | 0.41 |
| 2,3,3-Trimethyl-1-pentene | 26.8 | 27.3 | 26.9 | 27.0 | 0.21 |
| 2,3-Dimethyl-1-butene | 47.4 | 47.6 | 48.1 | 47.8 | 0.26 |
| 2,3-Dimethyl-2-butene | 17.0 | 16.9 | 17.0 | 17.0 | 0.07 |
| 1,3,5-Trimethylbenzene | 0 | 0.4 | 0.4 | 0.4 | 0.00 |
| 1-Octene | 21.1 | 21.0 | 21.5 | 21.1 | 0.27 |
| | 105.7 | 105.8 | 105.5 | 106.0 | 0.32 |
| 1-Dodecene | 12.8 | 12.7 | 12.9 | 12.8 | 0.10 |
| | 16.4 | 16.5 | 16.4 | 16.5 | 0.07 |
| | 64.1 | 66.0 | 65.7 | 66.1 | 0.21 |

An end-point bromine concentration of about $2 \times 10^{-5}$ moles per liter was found to drive addition reactions to completion rapidly and cause minimum substitution with the hydrocarbons investigated. This value is therefore used to establish the reference current in the indicator circuit. A higher end-point bromine concentration (two to five times this value) may be used to speed up the titration of unsaturates that react slowly with bromine and where substitution is not serious.

To calibrate the apparatus, the relationship between the indicator current and generated bromine concentration is determined for a given pair of indicator electrodes. A typical calibration curve is shown in Figure 4. As excess bromine is generated in the titration electrolyte, the indicator current starts increasing. Zero bromine concentration is the intercept of the residual and diffusion currents. Because bromine is generated at 100% efficiency, Faraday's law is used in establishing the bromine concentration. In this case, the indicator current corresponding to the desired bromine concentration was found to be 12.5 microamperes, which was taken as the reference current.

Coke-oven benzene usually contains enough thiophene to interfere with all methods of determining unsaturation by bromination. For this reason, the effect on the proposed method of thiophene in synthetic cyclohexene samples was determined. Results obtained at room temperature are shown in Table II. With the low concentrations of excess bromine used, thiophene present in the usual range of 200 to 500 p.p.m. causes an error of less than 4%. Thus, the effect of thiophene in this method is less than in other known procedures.

TABLE II

*Effect of thiophene*

| P.p.m. Thiophene in Cyclohexene | Bromine Index | |
|---|---|---|
| | Calculated | Found |
| 40 | 20.0 | 20.1  20.0 |
| 40 | 100.0 | 100.1  100.0 |
| 200 | 20.0 | 20.4  20.6 |
| 200 | 100.0 | 101.5  101.7 |
| 500 | 100.0 | 104.4  103.5 |

With most samples, the reference current will hold for 40 seconds on the first titration. For olefins that are slow to react with bromine, such as straight-chain terminal olefins, several approaches to the end point may be required. Figure 5 shows typical titration curves for two olefins having different rates of reaction with bromine. A recorder 83 was connected to the titrator as shown in Figure 1 and used to plot indicator current vs. time. Time intervals when bromine was generated coulometrically at a constant rate of 5.00 ma. are indicated by solid lines; other time intervals, by dashed lines. Line AB represents the generation of bromine in fresh electrolyte to the reference current. The instrument automatically stops generation at B. The stability of the reference current is shown by line BC. At C, an easily brominated compound, such as cyclohexene, has been introduced. The titration of this compound is shown as line DE. A difficultly brominated compound, such as 1-octene, has been added at F. With this sample, bromine was generated faster than the olefin reaction rate; hence, the false end points.

Large samples require a correction because of dilution of the electrolyte. The titration time is increased by the time required to bring the bromine concentration in the sample volume to the reference value. The correction, which can be determined experimentally or calculated from Faraday's law, is subtracted from the observed titration time to obtain the corrected titration time. Table III shows typical corrections.

TABLE III

*Typical dilution corrections*

| Sample Volume, ml. | Generation Current, ma. | Correction, Seconds |
|---|---|---|
| 0.5 | 1.0 | 2.1 |
| 0.5 | 5.0 | 0.4 |
| 2.0 | 1.0 | 8.5 |
| 2.0 | 5.0 | 1.7 |

Parasitic currents in the indicator circuit are minimized by the cell geometry shown in Figure 1 and by mounting the electrode assemblies on opposite sides of the titration cell 10. The generator cathode 14 is isolated from the solution by porous plug 81 to prevent liberated hydrogen gas from being swept into the solution. Traces of hydrogen reduce or even reverse the current flow in the indicator circuit 32 just before excess bromine is generated.

The diffusion current measured by the indicator electrodes has been shown in Figure 4 to be proportional to the concentration of bromine in the titration cell. The proportionality constant of this relationship depends upon the cathode area, applied voltage, effective thickness of the diffusion layer around the cathode, and the diffusion coefficient of bromine. With the cell assembly described, the cathode area and applied voltage are constant. The effective thickness of the diffusion layer is influenced greatly by the rate of electrolyte flow past the cathode. Therefore, to provide reproducible results, the electrode geometry is fixed and the stirring rate is maintained constant.

To maintain a constant diffusion coefficient of bromine, cell temperature must be held constant. The bromine concentration needed for a given indicator current doubles when the cell temperature decreases from 25° to 5° C. At 25° C., fluctuations of 0.2° C. can be tolerated during a titration and no temperature control is needed; at the lower temperature, control within 0.1° C. is required to minimize end point drift.

Although bromination is often carried out at low temperatures to discourage substitution, the micro amount of bromine present at the end point limits it. Results at both temperatures usually agree and operation at low temperature is normally not required. Compounds harder to brominate can be rapidly titrated to a single end point by increasing the bromine concentration; under these conditions, substitution may be a problem and low temperature operation may be justified.

Extensive use on many types of olefine samples has demonstrated that the automatic bromine index titrimeter described herein is very satisfactory for routine laboratory use.

A batch bromine index titration has been described, but the instrument can titrate a flowing plant stream, automatically monitor instantaneous changes, make a continuous record of the bromine reactive constituents of plant streams. Thus, 1 milliliter sample of a plant stream may be taken at about five-minute intervals and introduced into a titration cell operated in principle as described above. Any deviations from the selected bromine index level would in turn be reflected by changes in the titration time. These changes in titration time can be converted into electrical impulses for controlling pumps, plant process flows, etc.

A wide-range versatile titrator adaptable to a large number of coulometric titration problems can be devised by modification of the described titrator. This can be accomplished by using a sensitive galvanometer 16 with an adjustable Aryton shunt for resistor 52. By providing means for adjustment of the shunt and/or the zero set of the galvanometer, a wide range of adjustment of the reference current operating point can be achieved. This makes the titrator adaptable for use with any amperometric end-point titration in which the titrant ion can be coulometrically generated. Indicator electrodes are selected on the basis of providing the greatest sensitivity to the ion being generated.

The range of coulometric generation current can readily be increased by adjustment of resistance 21b to provide for higher generation rates, for example 100 milliamperes. The voltage applied to the generation electrodes 14 and 14a can be reversed readily by interchanging wires 42 and 43 at the electrode block 29 so that reduction of metallic ions which occurs at the cathode can be utilized. Where the ion is being generated from the electrolyte, platinum electrodes are preferred.

Although I have described my invention in terms of a specific form of apparatus, it should be understood that this apparatus and the described examples of operation are by way of illustration only and that my invention is not limited thereto. Accordingly, it is contemplated that those skilled in the art will make modifications in the apparatus and operation procedures in view of my disclosure without departing from the spirit of the invention.

What I claim is:

1. An apparatus comprising in combination a titration cell, electrode means for coulometrically generating bromine in an electrolyte within said cell, said electrode means for generating bromine comprising a tube, a platinum wire spiral cathode within said tube, an isolating plug closing the bottom of said tube, a wire spiral anode wound around said tube adjacent said plug, and a generation current source means connected to said electrode means, said source means including control means for applying two coulometric current ranges to said electrode means, a second pair of spaced electrodes in said cell for detecting changes in the concentration of free bromine in the electrolyte in said cell, means for establishing a preselected level of concentration of bromine in said electrolyte, means responsive to preselected level in the concentration of such bromine in said electrolyte terminating the coulometric generation of bromine therein, and means for indicating the length of time during which said coulometric generation takes place.

2. In a system for conducting titrations with bromine in a fluid, the combination of a vessel adapted to contain a quantity of an electrolyte, electrode means including a first pair of electrodes for flow of direct current therebetween to generate bromine at a fixed rate within said vessel in the presence of such electrolyte, means for establishing a preselected level of concentration of bromine in said electrolyte, means in circuit with said electrodes for indicating the duration of the flow of current across said electrodes, said electrode means for generating bromine comprising a first platinum cathode, a second platinum anode adjacent said cathode, a porous member isolating said cathode from said anode, and means for applying selectively two coulometric current ranges to said cathode and anode, a second pair of electrodes sensitive substantially only to the diffusion currents in such electrolyte due to the presence of a preselected excess bromine by such first pair of electrodes, and means in circuit with said second pair of electrodes for controlling the flow of current to said first pair of electrodes.

3. In a system for quantitatively determining the concentration of a reactive constituent in solution the combination of a vessel providing a treating chamber for said solution, means for delivering a measured quantity of said solution to said vessel, means including a first pair of electrodes disposed for flow of direct current therebetween to generate reactant coulometrically in said solution within said vessel, said first pair of electrodes comprising a first platinum cathode, a second platinum anode adjacent said cathode, and a porous member isolating said cathode from said anode, a second pair of electrodes in said vessel sensitive to diffusion currents therein, and means in circuit with said first pair of electrodes actuated in response to changes in flow of diffusion currents in said second pair of electrodes whereby the length of time of said coulometric generation is controlled, said last-named means terminating the coulometric generation when actuated by said second pair of electrodes in response to a substantial preselected increase in the diffusion current flowing across said second pair of electrodes due to the presence of a preselected concentration of generated reactant.

4. A titration apparatus including a titration cell, means for stirring the contents of said cell to impart rotary motion thereto, a first electrode means for generating bromine within said cell as the titrating agent, said electrode means comprising an anode and a cathode juxtaposed and separated from each other by a porous member, a second pair of electrodes spaced from said first electrode means for amperometrically detecting the presence of a preselected excess bromine to signify the termination of the titration, electrical control means responsive to the flow of current in said second pair of electrodes which current increases appreciably upon the production of excess bromine, an electrical timer, a switch means controlling said timer and controlling the power source to said first pair of electrode means, and a meter-relay means for controlling said switch means in response to the flow of current across said second pair of amperometrically detecting electrodes in the presence of such excess.

References Cited in the file of this patent

UNITED STATES PATENTS

| | | |
|---|---|---|
| 2,621,671 | Eckfeldt | Dec. 16, 1952 |
| 2,651,612 | Haller | Sept. 8, 1953 |
| 2,805,191 | Hersch | Sept. 3, 1957 |

OTHER REFERENCES

J.A.C.S., vol. 70, 1948, pp. 1047–1052; articles by Myers et al.

Lundell et al.: Outlines and Methods of Chemical Analysis, John Wiley & Sons, New York, Jan. 3, 1938, pp. 163–164.

Ramsey et al.: Anal. Chemistry, vol. 22, 1950, pp. 332–335.

De Ford et al.: Anal. Chemistry, vol. 23, July 1951, pp. 938–40.

"Anal. Chemistry," vol. 19 (1947), pp. 197–200 of article by Sease et al.: also vol. 23 (1951), pp. 941–944 of article by De Ford et al.